Patented Dec. 30, 1941

2,268,467

UNITED STATES PATENT OFFICE 2,268,467

OXIDATIVE CONDENSATION OF ORGANIC MERCAPTANS AND AMINES

George W. Ashworth, St. Louis, Mo., assignor to Monsanto Chemical Company, St. Louis, Mo., a corporation of Delaware No Drawing. Application July 26, 1940, Serial No. 347,769

13 Claims. (Cl. 260—306)

The present invention relates to the preparation of oxidative condensation products of organic mercaptans and amines and has specific reference to the oxidative condensation of mercapto aryl thiazoles and amines.

It is an object of this invention to provide an improved method for the manufacture of oxidative condensation products of organic mercaptans and primary and secondary amines. It is a further object of this invention to manufacture oxidative condensation products of organic mercaptans and primary and secondary amines in good yields and at an economical cost. A still further object is to provide a process for the use of cheap oxidizing agents. A particular object is to provide a method for the conversion of substantially stoichiometric quantities of alkali metal mercapto aryl thiazole and suitable amines to a high yield of an amino thio aryl thiazole. Other and further objects will be hereinafter shown.

Briefly stated, this invention comprises the conversion by means of hypochlorites of organic mercaptans and amines to oxidative condensation products at constant hydrogen ion concentration. More particularly this invention comprises the step of adding to an aqueous solution of an alkali metal mercaptan in admixture with a suitable primary or secondary amine, a hypochlorite oxidizing agent while maintaining the pH of the original reaction mixture by any convenient means.

The amines contemplated for use in the process of this invention are primary and secondary amines stronger than ammonia. That is to say amines containing at least one hydrogen atom on an amino nitrogen atom whose dissociation constant is greater than $1.8 \times 10^{-5}$. While it is not meant to imply that no other primary and secondary amines give oxidative condensation products, the group defined in general give excellent results in the present process and provide preparations within the realm of commercial possibility.

As exemplary of amines which may be employed there may be mentioned cyclohexylamine, benzyl amine, piperidine, methyl amine, ethylene diamine, n-butyl amine, n-amyl amine, ethyl amine, p-ethyl cyclohexylamine, propyl amine, o-cyclohexyl cyclohexylamine, di ethyl amine, di isoamyl amine, di isobutyl amine, dimethyl amine, di propyl amine, isoamyl amine, isobutyl amine, isopropyl amine, allyl amine, morpholine, methyl ethyl amine, methyl benzyl amine, hexahydrobenzyl amine, dibenzyl amine, methyl naphthyl amine, ethyl cyclohexylamine, dicyclohexylamine, diphenyl guanidine and equivalents and analogues thereof. While as indicated above the strength of an amine is a primary factor in determining its capacity to form oxidative condensation products with organic mercaptans it is by no means the only factor. For example, primary amines are, without regard to strength, much more sensitive to reaction conditions than secondary amines and present a much greater problem as regards attaining satisfactory results. For this reason the latter group will be treated in greater detail in the description following.

Any organic mercaptans may be used in the present process. Typical examples include thio phenol, thio β naphthol, 2 mercapto thiazoline, 2 mercapto 4,5 dihydro glyoxaline, 2 mercapto benzimidazole, 2 mercapto benzoxazole, 2 mercapto 4,5 dimethyl thiazole, 2 mercapto 4-ethyl thiazole and particularly 2 mercapto aryl thiazoles as for example 2-mercaptobenzothiazole, 2-mercapto naphthothiazole, 2-mercapto 4-phenyl benzothiazole, 2-mercapto methyl benzothiazole, 2-mercapto chlorbenzothiazole and equivalents and analogues thereof.

As noted, primary amines and organic mercaptans form oxidative condensation products with difficulty. It is known that certain primary amines such as cyclohexyl and benzyl amines give good results where hydrogen peroxide is used as the oxidizing agent providing a mineral acid is used in conjunction therewith (U. S. 2,191,657 to Harman). That mineral acids increase the oxidizing potential of hydrogen peroxide is likewise well known as is the fact that organic mercaptans such as 2-mercapto thiazoles are capable of forming a number of oxidation products. For example they may be oxidized to dithiazyl disulfides or to 2-hydroxy aryl thiazoles. These facts suggest that it should be possible to adjust either the oxidation potential of the reaction mixture or that of the oxidizing agent or both so as to favor the desired reaction and minimize side reactions. Under ideal conditions it should then be possible to replace hydrogen peroxide with cheap hypochlorites without impairing the yields. However, the oxidation potential of the hypochlorite was found to be relatively unimportant and in the presence of organic mercaptan and amine the hypochlorite was used up with such rapidity that no oxidation potential of the reaction mixture was noticeable. Surprisingly, the critical factor was found to be the pH and not the oxidation potential. Since the actual pH is not subject to a precise determination by the method found most convenient for indicating hydrogen ion concentration, reference will be had to the difference in potential in millivolts between an antimony electrode (indicator electrode) and a saturated calomel half cell as the standard reference electrode, measurement being made by a suitable potentiometer. In general when carrying out an oxidative condensation between an organic mercaptan and a primary or secondary amine having a dissociation constant greater than that of ammonia the pH of the solution at start of alkali metal mercaptan in admixture with the amine should be maintained throughout the reaction. Expressed as millivolts it is preferred to carry out the reaction at a pH equivalent to 680–710 millivolts determined by the system Sb-Sat. calomel. However, with some amines the potential may be slightly lower. Of course other methods may be employed for indicating pH but a potentiometric method is particularly convenient where it is desired to take continuous readings and to this end a stick of antimony is satisfactory. Due to the high alkalinity a glass electrode is less desirable being subject to attack by the alkali. Because of the high salt content of the solutions which introduces a so called "salt error," the actual pH is somewhat uncertain. As an indication of the alkalinity at which the present inventon is operated, the pH of a solution of sodium mercaptobenzothiazole containing 16% by weight mercaptobenzothiazole in admixture with an equimolecular quantity of cyclohexylamine at 10° C. is about 11.6 as measured by a suitable pH instrument and without applying corrections for sodium ion etc. The potential is 690–700 millivolts.

Alkali metal hypochlorites, particularly sodium hypochlorite, give excellent results in the process. Hypobromites and hypoiodides behave in similar manner but are of little practical interest due to their comparatively high cost. As previously stated the oxidizing potential of the hypochlorite is not particularly critical. For example it was found that varying the oxidizing potential of sodium hypochlorite from 460 to 700 millivolts, other conditions being constant, resulted in about 1% higher yield at 700 millivolts than at 460 millivolts. Since the higher figure represents the oxidation potential of sodium hypochlorite solution containing no free caustic it is desirable to maintain the free caustic present in the hypochlorite at a minimum.

A more important variable is the concentration of the hypochlorite solution which for best results should be at least 7.5% by weight of active hypochlorite but above this point the concentration has relatively little effect on the yield. For example varying the concentrations from a 5% solution of sodium hypochlorite to 7.5% sodium hypochlorite increased the yield of cyclohexylamino thio benzothiazole 3.7% but increasing the concentration from 7.5% to 9.6% increased the yield only 0.5%. The optimum concentration of the hypochlorite is around 8–10%.

Contrary to expectations a much larger amount of hypochlorite than that theoretically required is necessary for best results. The general reaction involved in the present invention is believed to be as follows:

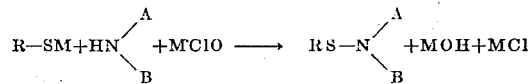

where R represents an organic radical, M represents an alkali metal, A represents a hydrogen atom or an organic radical and B represents an organic radical, or A and B together form a heterocyclic nucleus. So far as is known there is no good theoretical reason why substantially more than one molecular proportion of hypochlorite should be required to convert one molecular proportion each of amine and organic mercaptan to an oxidative condensation product of the type indicated. As a matter of fact about 1.5 molecular proportions of hypochlorite are required for maximum yields. Of course the exact proportion varies somewhat but in general in the neighborhood of 50% excess over the theoretical requirements give the best results. Materially greater amounts result in an inferior product due to the attack of the hypochlorite upon the product and materially less amounts result in greatly diminished yields. A very satisfactory and convenient method of determining the proper excess of hypochlorite is afforded as an incidental feature of the use of the antimony electrode for indicating the pH of the reaction mixture. Thus, during the course of the reaction a solution of a suitable hypochlorite is run into an aqueous mixture of a water soluble salt of an organic mercaptan and a suitable amine during which the reaction mixture is maintained at a pH corresponding to 690–700 millivolts as measured by an antimony electrode in conjunction with a saturated calomel half cell. This is accomplished by the addition of small portions of mineral acid as for example sulfuric acid, hydrochloric acid, phosphoric acid or the like. In this connection it will be noted that in the general equation set forth above a base is formed as one of the byproducts of the reaction so that the mixture tends to become more alkaline as the reaction proceeds. At the completion of the reaction there is usually a sharp drop in potential which occurs with about a 50% excess of hypochlorite. While this phenomenon is not completely understood it is an empirically discovered fact which to say the least is most convenient for indicating the end point of the reaction and permits a very close control of the amount of oxidizing agent. It appears that the antimony electrode is somewhat sensitive to oxidizing agents and builds up a small oxidation potential which becomes noticeable in the presence of free hypochlorite.

The proportion of amine to organic mercaptan which will give the most economical conversion to oxidative condensation product depends largely upon the nature of the particular amine to be reacted, the ease of recovering any excess used and the like. Stoichiometric amounts of organic mercaptan and most secondary amines as well as certain primary amines, notably cyclohexylamine, benzyl amine, n-amyl amine, n-butyl amine and o-cyclohexyl cyclohexylamine may be converted to a high yield of oxidative condensation product. With other amines such as methyl amine, ethylene diamine and secondary mono butyl amine a much higher conversion is obtained by employing a relatively large excess of amine as for example three mols of amine to one of organic mercaptan. Even amines which give satisfactory results with the quantity theoretically required permit a somewhat higher conversion when employed in slightly higher proportions. For example 1.1 molecular parts of amine per 1.0 molecular part of organic mercaptan has given excellent results.

With most organic mercaptans and in particular with mercaptobenzothiazoles the preferred temperature for carrying out the reaction is from 10°–30° C. While it is not meant to imply that these are the absolute limits it has been found that above 30° C. and below 10° C. the yields are progressively diminished. It is best to carry out the greater part of the reaction at about 20° C. or in other words around room temperature. To this end since the reaction is slightly exothermic it is convenient to cool the aqueous mercapto thiazole-amine mixture to about 10° and add the hypochlorite permitting the temperature to rise at will but cooling if necessary to keep below 30° C. To maintain the reaction throughout at about 10° C. does not give as good results as at the higher temperature but between 20–30° no effect on the yields has been observed.

The following specific examples are to be understood as illustrative of the invention but in nowise limitative of the scope thereof.

*Example I*

To 627 parts by weight of aqueous sodium mercaptobenzothiazole solution containing 16% by weight mercaptobenzothiazole (substantially 0.6 molecular proportion) are added 60 parts by weight (substantially 0.6 molecular proportion) of cyclohexylamine. This mixture contained in a suitable reactor as for example a stainless steel vessel of suitable size, is cooled to 10° C. An antimony electrode and a standard saturated calomel half cell are inserted into the solution and the reading taken by means of a suitable potentiometer. The potential at this point should be 690–700 millivolts. Into this solution there is slowly fed a maximum of about 0.93 molecular proportion of substantially 10% sodium hypochlorite, the potential of the reaction mixture throughout the addition being maintained at 690–710 millivolts. Control of the potential may be readily effected by the concurrent addition of 40% sulfuric acid at the rate required. On the average about 56 parts by weight of the 40% acid are consumed. If toward the end the potential drops below 690 millivolts the addition of hypochlorite is stopped as this indicates the end of the reaction. The batch is then pumped to a filter and the cake washed free of alkali and excess water removed by any convenient means such as blowing with air or centrifuging after which the product is crushed and dried at 50° C. The yield of cyclohexylamino thio benzothiazole is 85% or higher. A conversion based on mercaptobenzothiazole of better than 90% can be obtained by employing a five or ten percent excess of amine.

Most of any unreacted cyclohexylamine which may be present can be recovered by distilling over the first five to ten percent of the filtrate with a good column since in the presence of water, cyclohexylamine forms an azeotropic mixture, boiling at 96.4° C. at 760 mm. containing 44.2% cyclohexylamine by weight.

The hypochlorite may be readily prepared by passing chlorine into caustic soda solution. For example a solution adapted for direct use in the procedure outlined above is prepared as follows: 315 parts by weight of 25% caustic soda (substantially 1.97 molecular proportions) are diluted with 300 parts by weight of water and cooled to 5–10°. A total of 66 parts by weight (substantially 0.93 molecular proportions) of chlorine are passed into the cold solution at the rate of 18–20 parts per hour keeping the temperature below 15° C. After all of the chlorine has been combined the solution may then be employed directly in the preparation outlined above. It is to be understood, however, that this quantity of hypochlorite represents the average figure as the amounts will vary with the percentage of hypochlorite and free caustic present. In general in making the hypochlorite solutions for use in this invention chlorine is added to caustic until the free caustic as determined by titration is about 0.5 percent. Rubber lined tanks are preferably employed both for making and storing the hypochlorite solutions. The making vessel may be advantageously fitted with stainless steel coils through which ice water is circulated, a stainless steel thermometer well with a glass liner filled with water and connected to a dial thermometer and a suitable agitator having a stainless steel shaft and propellers. Hard rubber is satisfactory for the chlorine feed line.

*Example II*

Substantially 140 parts by weight of an aqueous solution of sodium mercaptobenzothiazole containing 11.8% by weight of mercaptobenzothiazole (substantially 0.1 molecular proportion) and substantially 7.3 parts by weight of n-mono-butyl amine (substantially 0.1 molecular proportion) were placed in a suitable vessel fitted with a stirrer. An antimony electrode and a standard saturated calomel half cell were immersed in the mixture and the potential noted by means of a potentiometer. At 20° C. the reading was 680 millivolts. To the rapidly stirred mixture maintained at about 20° C. and at a pH corresponding to about 680 millivolts substantially 0.15 molecular proportion of an approximately 10% aqueous sodium hypochlorite solution were added. The product separated as a reddish brown oil which was drawn off from the aqueous solution, dissolved in a suitable solvent such as ether and any unreacted mercaptobenzothiazole removed by washing the solution with 2% caustic soda solution. After removal of the solvent the residue comprising the desired n-butyl amino thio benzothiazole was obtained in a yield of 84% of theory.

*Example III*

A somewhat higher conversion may be obtained by employing a slight excess over theory of the n-mono butyl amine. For example in another run the charge consisted of 2650 parts by weight of an aqueous solution of sodium mercaptobenzothiazole containing approximately 15.8% by weight of mercaptobenzothiazole (substantially 2.5 molecular proportions) and 201 parts by weight of n-mono butyl amine (substantially 2.75 molecular proportions). The manipulation was similar to that described in the above example. 2670 parts by weight of approximately 10% sodium hypochlorite (3.75 molecular proportions) were added over a period of 140 minutes and at a temperature of 13–22° C., the potential of operation being maintained at 680–690 millivolts. After the completion of the reaction at which time the potential dropped to 662 millivolts the reddish oily product was isolated as described in the above example. This product which solidified on standing was obtained in a yield of 86% of theory.

*Example IV*

Substantially 142 parts by weight of an aqueous solution of sodium mercaptobenzothiazole containing 11.8% by weight of mercaptobenzothiazole (substantially 0.1 molecular proportion) and substantially 8.8 parts by weight of n-mono amyl amine (substantially 0.1 molecular proportion) were placed in a suitable vessel fitted with a stirrer. An antimony electrode and a standard saturated calomel half cell were immersed in the mixture and the potential noted by means of a potentiometer. At 20° C. the reading was 680 millivolts. To the rapidly stirred mixture maintained at about 20° C. and at a pH corresponding to about 680 millivolts, substantially 0.15 molecular proportion of an approximately 10% aqueous sodium hypochlorite solution was added. The product separated as an amber oil. The oil was drawn off from the aqueous solution, dissolved in a suitable solvent such as ether and any unreacted mercaptobenzothiazole removed by washing with 2% caustic soda. After removal of the solvent the desired n-amyl amino thio benzothiazole was obtained in a yield of 83.4% of theory.

Example V

The general procedure in this case was substantially the same as outlined in Examples II and III. Substantially 18.1 parts by weight (substantially 0.1 molecular proportion) of o-cyclohexyl cyclohexylamine was added to 142 parts by weight of an aqueous solution of sodium mercaptobenzothiazole containing 11.8% by weight of mercaptobenzothiazole (substantially 0.1 molecular proportion). Substantially 0.15 molecular proportion of an approximately 10% solution of sodium hypochlorite was added to the mixture so prepared, the reaction being carried out at 20–30° C. and at a pH corresponding to about 680 millivolts. A good yield of o-cyclohexyl cyclohexylamino thio benzothiazole was obtained as a waxy buff colored solid.

Example VI

Into a suitable vessel there was charged 347 parts by weight of an aqueous solution of sodium mercaptobenzothiazole containing approximately 12% by weight of mercaptobenzothiazole (substantially 0.25 molecular proportion) and 153 parts by weight of monoethanol amine (substantially 2.5 molecular proportions). To this mixture maintained at 18–21° C. there was added over a period of about 80 minutes substantially 262 parts by weight of a 10.6% aqueous sodium hypochlorite solution (substantially 0.375 molecular proportion). During the addition of the latter the reaction mixture was maintained at a pH corresponding to about 670–675 millivolts, the pH of the original charge, as determined by an antimony electrode in conjunction with a standard saturated calomel half cell. This required the addition during the reaction of about 22 parts by weight of 38% hydrochloric acid. After completion of the reaction the insoluble product which had separated was filtered from the aqueous vehicle, washed with water and dried. The yield was 42.5 parts by weight or 75.3% of theory of a product believed to be β hydroxy ethyl amino thio benzothiazole which melted at 96–99° C.

Example VII

Into a suitable vessel there was charged 347 parts by weight of an aqueous solution of sodium mercaptobenzothiazole containing approximately 12% by weight of mercaptobenzothiazole (substantially 0.25 molecular proportion) and 55 parts by weight of secondary monobutyl amine (substantially 0.75 molecular proportion). To this mixture maintained at 18–21° C. there was added over a period of about 60 minutes substantially 232 parts by weight of a 10.6% aqueous sodium hypochlorite solution (substantially 0.33 molecular proportion). During the addition of the latter the reaction mixture was maintained at a pH corresponding to about 695–700 millivolts as determined by an antimony electrode in conjunction with a standard saturated calomel half cell. This required the addition during the reaction of about 19 parts by weight of 38% hydrochloric acid. After completion of the reaction at which point the potential dropped to 665 millivolts, the insoluble product which had separated was filtered from the aqueous vehicle, washed with water and dried. The yield was 56 parts by weight or 94% of theory of a yellow waxy solid melting at 50–53° C. believed to be secondary monobutylamine thio benzothiazole.

Example VIII

Into a suitable vessel there was charged 347 parts by weight of an aqueous solution of sodium mercaptobenzothiazole containing approximately 12% by weight of mercaptobenzothiazole (substantially 0.25 molecular proportion) and 22.4 parts by weight of 95% piperidine (substantially 0.25 molecular proportion). To this mixture maintained at 18–21° C. there was added over a period of about 80 minutes substantially 262 parts by weight of a 10.6% aqueous sodium hypochlorite solution (substantially 0.375 molecular proportion). During the addition of the latter the reaction mixture was maintained at a pH corresponding to 685–695 millivolts as determined by an antimony electrode in conjunction with a standard saturated calomel half cell. This required the addition during the reaction of about 16.6 parts by weight of 38% hydrochloric acid. After completion of the reaction the insoluble product which had separated was filtered from the aqueous vehicle, washed and dried. A good yield (about 83% of theory) of piperidine thio benzothiazole, M. P. 70–78° C., was obtained.

Example IX

Into a suitable vessel there was charged 167 parts by weight of an aqueous solution of sodium mercaptobenzothiazole containing approximately 12% by weight of mercaptobenzothiazole (substantially 0.12 molecular proportion) and 100 parts by weight of 60% ethylene diamine (substantially 1.0 molecular proportion). To this mixture maintained at 18–21° C. there was added over a period of about 30 minutes substantially 120 parts by weight of a 10.6% aqueous sodium hypochlorite solution (substantially 0.17 molecular proportion). During the addition of the latter the reaction mixture was maintained at a pH corresponding to about 700–710 millivolts as determined by an antimony electrode in conjunction with a standard saturated calomel half cell. This required the addition during the reaction of about 10.7 parts by weight of 38% hydrochloric acid. At the completion of the reaction at which point the potential dropped to 670 millivolts, the insoluble product which had separated was filtered from the aqueous vehicle, washed with water and dried. 17 parts by weight of a white powder melting at 112–120° C. was obtained.

As appears from the foregoing description catalysts are unnecessary in carrying out the oxidation. Obviously variations may be introduced with regard to the details of the preparations specifically described without departing from the spirit or scope of this invention. This invention is limited solely by the claims attached hereto as part of the present specification.

What is claimed is:

1. The method of making a chemical product which comprises condensing in aqueous solution a water soluble salt of an organic mercaptan and an amine stronger than ammonia containing at least one hydrogen atom on an amino nitrogen atom in the presence of a hypochlorite while maintaining the reaction mixture at a pH corresponding to 670–710 millivolts as measured by the system Sb-Sat. calomel.

2. The step in the process of condensing in aqueous solution an alkali metal salt of an organic mercaptan and an amine stronger than ammonia containing at least one hydrogen atom on an amino nitrogen atom which comprises adding a hypochlorite to the mercaptan-amine mixture while maintaining the pH at substantially that of the original solution.

3. The method of making a chemical product which comprises condensing in aqueous solution a water soluble salt of a mercapto thiazole and an amine stronger than ammonia containing at least one hydrogen atom on an amino nitrogen atom in the presence of a hypochlorite while maintaining the reaction mixture at a pH corresponding to 680–710 millivolts as measured by the system Sb-Sat. calomel.

4. The step in the process of condensing in aqueous solution an alkali metal mercapto thiazole and an amine stronger than ammonia containing at least one hydrogen atom on an amino nitrogen atom which comprises adding a hypochlorite to the thiazole-amine mixture while maintaining the pH at substantially that of the original solution.

5. The method of making a chemical product which comprises condensing in aqueous solution a water soluble salt of a mercapto aryl thiazole and an amine stronger than ammonia containing at least one hydrogen atom on an amino nitrogen atom in the presence of an alkali metal hypochlorite while maintaining the solution at a pH corresponding to 680–710 millivolts as measured by the system Sb-Sat. calomel.

6. The step in the process of condensing in aqueous solution a mercapto aryl thiazole and an amine stronger than ammonia containing at least one hydrogen atom on an amino nitrogen atom which comprises adding a hypochlorite to the thiazole-amine mixture while maintaining the reaction mixture at a pH corresponding to 680–710 millivolts as measured by the system Sb-Sat. calomel.

7. The step in the process of condensing in aqueous solution an alkali metal salt of a mercaptobenzothiazole and an amine stronger than ammonia containing at least one hydrogen atom on an amino nitrogen atom which comprises adding a hypochlorite to the thiazole-amine mixture while maintaining the pH at substantially that of the original solution.

8. The step in the process of condensing in aqueous solution a mercapto aryl thiazole and an amine stronger than ammonia containing at least one hydrogen atom on an amino nitrogen atom which comprises adding to the amine-thiazole mixture an aqueous solution of at least 7.5% strength by weight of alkali metal hypochlorite substantially free of excess caustic alkali while maintaining the reaction mixture at a pH corresponding to 680–710 millivolts as measured by the system Sb-Sat. calomel.

9. The step in the process of condensing in aqueous solution a mercapto aryl thiazole and an amine stronger than ammonia containing at least one hydrogen atom on an amino nitrogen atom which comprises adding to the amine-thiazole mixture in an amount about 50% above that theoretically required of a solution of alkali metal hypochlorite of strength at least 7.5% by weight while maintaining the reaction mixture at a pH corresponding to 680–710 millivolts as measured by the system Sb-Sat. calomel.

10. The method of making a chemical product which comprises effecting an oxidative condensation in aqueous solution of a soluble salt of a mercaptobenzothiazole and a primary amine having a dissociation constant greater than $1.8 \times 10^{-5}$ by adding to the amine-thiazole mixture an alkali metal hypochlorite while maintaining the reaction mixture at a pH corresponding to 680–710 millivolts as measured by the system Sb-Sat. calomel.

11. The method of making a chemical product which comprises effecting an oxidative condensation in aqueous medium of substantially equimolecular proportions of an alkali metal salt of a mercapto aryl thiazole and an amine selected from the group consisting of cyclohexylamine, benzyl amine, n-amyl amine, n-butyl amine and o-cyclohexyl cyclohexylamine by adding to the amine-thiazole mixture an alkali metal hypochlorite in an amount about 50% above that theoretically required while maintaining the pH of the reaction mixture at substantially that of the original solution.

12. The method of making a chemical product which comprises effecting an oxidative condensation in aqueous solution of substantially equimolecular proportions of an alkali metal salt of a mercaptobenzothiazole and an amine selected from the class consisting of cyclohexylamine, benzyl amine, n-amyl amine, n-butyl amine and o-cyclohexyl cyclohexylamine by adding to the amine-thiazole mixture at 10°–30° C. an aqueous solution of an alkali metal hypochlorite while maintaining the reaction mixture at a pH corresponding to 680–710 millivolts as measured by the system Sb-Sat. calomel.

13. The method of making a chemical product which comprises effecting an oxidative condensation in aqueous solution of substantially equimolecular proportions of an alkali metal salt of mercaptobenzothiazole and cyclohexylamine by adding to the amine-thiazole mixture at 10°–30° C. an aqueous alkali metal hypochlorite solution of at least 7.5% strength and in an amount about 50% in excess of that theoretically required while maintaining the reaction mixture at a pH corresponding to 690–710 millivolts as measured by the system Sb-Sat. calomel.

GEORGE W. ASHWORTH.